United States Patent
Mochizuki

(10) Patent No.: US 11,354,076 B2
(45) Date of Patent: Jun. 7, 2022

(54) MANAGEMENT SERVER, CONTROL METHOD, AND STORAGE MEDIUM

(71) Applicant: CANON KABUSHIKI KAISHA, Tokyo (JP)

(72) Inventor: Hirofumi Mochizuki, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/920,964

(22) Filed: Jul. 6, 2020

(65) Prior Publication Data
US 2021/0026582 A1 Jan. 28, 2021

(30) Foreign Application Priority Data

Jul. 22, 2019 (JP) .............................. JP2019-134799

(51) Int. Cl.
| | |
|---|---|
| *G06F 15/00* | (2006.01) |
| *G06F 3/12* | (2006.01) |
| *G06K 1/00* | (2006.01) |
| *H04N 1/32* | (2006.01) |

(52) U.S. Cl.
CPC .......... *G06F 3/1254* (2013.01); *G06F 3/1204* (2013.01); *G06F 3/126* (2013.01); *G06F 3/1231* (2013.01); *H04N 1/32545* (2013.01)

(58) Field of Classification Search
CPC .... G06F 3/1254; G06F 3/1204; G06F 3/1231; G06F 3/126; H04N 1/32545
USPC ............................... 358/1.13, 1.14, 1.15, 1.1
See application file for complete search history.

(56) References Cited

U.S. PATENT DOCUMENTS

| | | | |
|---|---|---|---|
| 9,182,995 B2 | 11/2015 | Nagashima | |
| 2005/0281258 A1* | 12/2005 | Takahara | H04L 29/12009 370/395.54 |
| 2007/0204045 A1* | 8/2007 | Shima | H04N 1/00244 709/226 |
| 2013/0135672 A1* | 5/2013 | Watanabe | G06F 3/1256 358/1.15 |
| 2015/0248263 A1* | 9/2015 | Hattori | G06F 3/1285 358/1.15 |
| 2016/0098234 A1* | 4/2016 | Weaver | G06K 15/02 358/1.15 |
| 2018/0063373 A1* | 3/2018 | Hardy | G06F 3/1226 |

(Continued)

FOREIGN PATENT DOCUMENTS

JP 2014038368 A 2/2014

*Primary Examiner* — Douglas Q Tran
(74) *Attorney, Agent, or Firm* — Rossi, Kimms & McDowell LLP

(57) ABSTRACT

A management server connected, to a plurality of image forming devices and an information processing device having a printer driver is provided. The server manages, for each location, network information and information of print performance of an image forming device belonging to the location; identifies a location to which the information processing device belongs, based on the network information, upon receiving from the information processing device a notification that network setting of the information processing device has been changed; and transmits, to the information processing device, a device setting of the printer driver based on information of print performance corresponding to an image forming device belonging to the location being identified.

15 Claims, 14 Drawing Sheets

(56) References Cited

U.S. PATENT DOCUMENTS

2019/0050184 A1\* 2/2019 Ozawa ................. G06F 3/1275
2020/0053244 A1\* 2/2020 Yamada ............. H04N 1/00973

\* cited by examiner

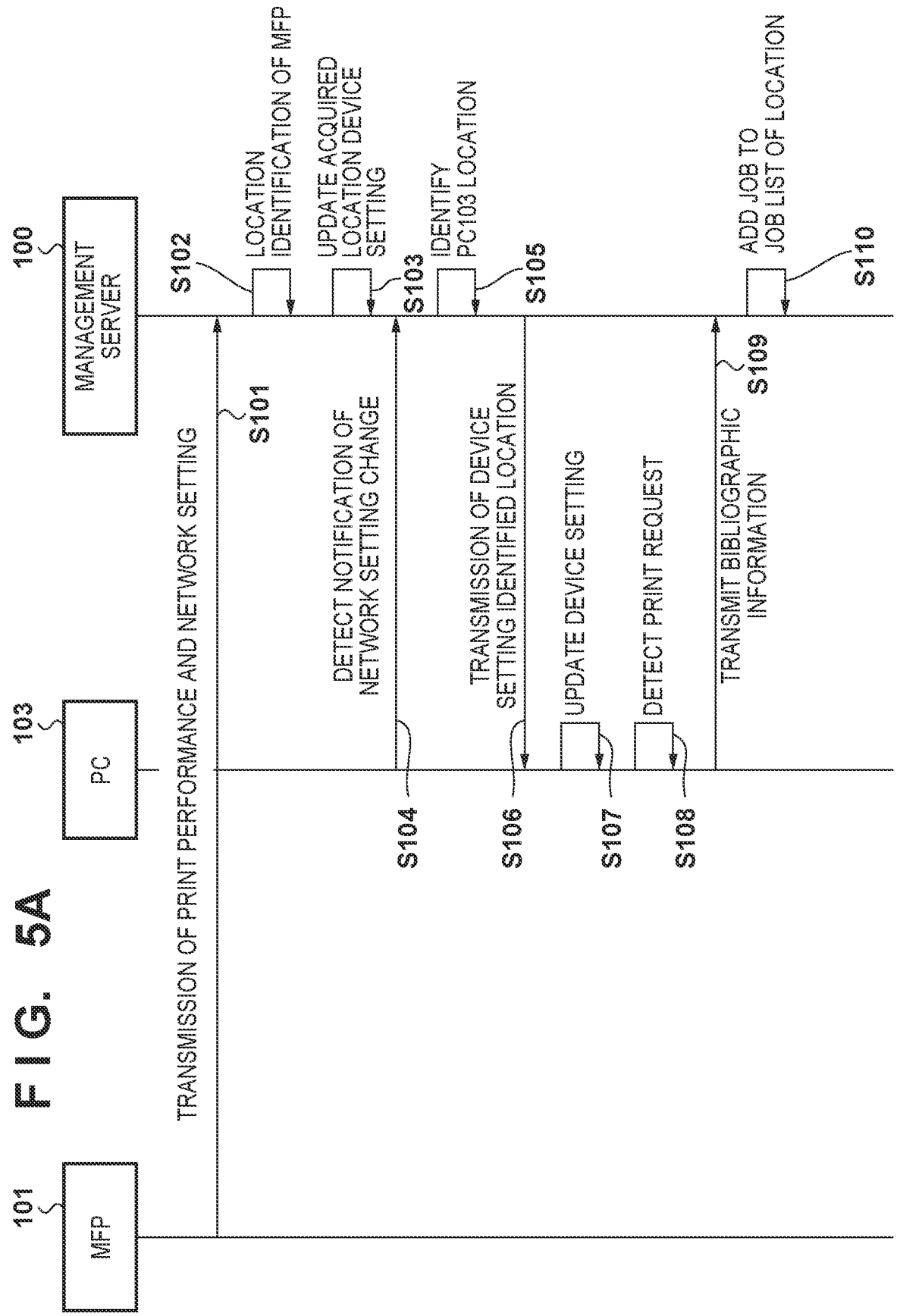

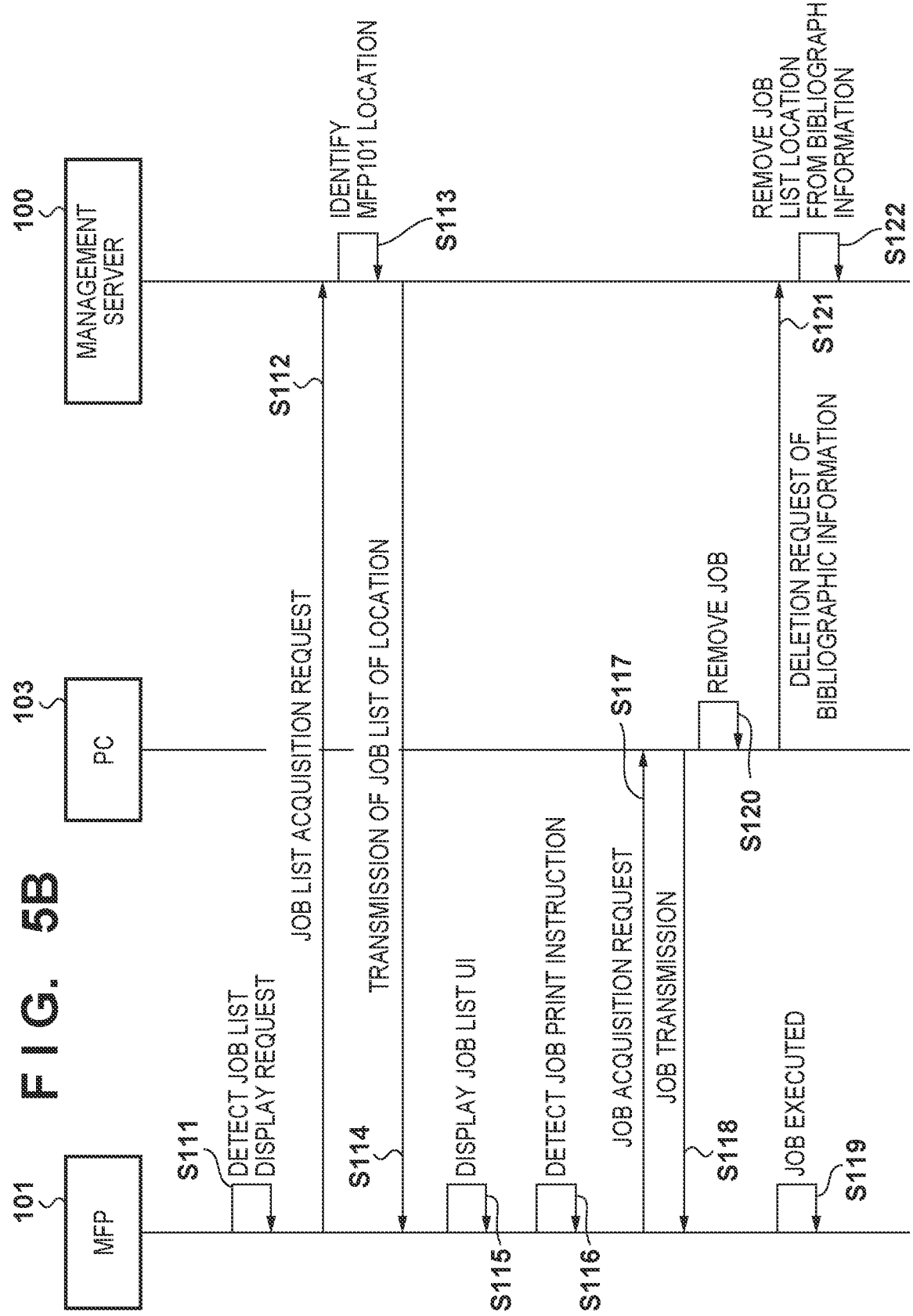

MANAGEMENT SERVER, CONTROL METHOD, AND STORAGE MEDIUM

BACKGROUND OF THE INVENTION

Field of the Invention

The present disclosure relates to a management server, a control method, and a storage medium.

Description of the Related Art

Conventionally, there have been proposed methods for installing a driver supporting MFP in an information processing device (e.g., a PC) in an image forming system including a plurality of PCs and a plurality of image forming devices (e.g., MFPs). Japanese Patent Laid-Open No. 2014-38368 describes a method, for a management server managing a plurality of MFPs and PCs, that installs a new driver in a corresponding PC in accordance with updating of a driver of an MFP or a change of device information.

In addition, there is wide spread use of a print function that allows printing from any of the plurality of MFPs (hereinafter "pull print"). When implementing "pull print", the management server usually manages information of print jobs to allow printing from any of the MFPs. In addition, such a print function provides a function of limiting print-allowed MFPs to a certain group for improved security and performance. For example, there is a "location function" that allows "pull print" only when PCs and MFPs are located in a same workplace. The location function uses IP addresses and host names within a certain range, for example, to group PCs and MFPs located in a same location, and allows printing only among devices belonging to the group.

In prior art, a general-purpose printer driver is registered to a PC in order to enable printing from any MFP in a same location and printing is performed using the printer driver. On the other hand, there may be a case where a user carrying a PC moves across different locations and uses the PC. When the user moves across locations, an MFP available by the "pull print" is switched to another MFP belonging to the new location. On this occasion, a proper function of the MFP cannot be used unless the device setting of the printer driver of the PC is reset in accordance with the MFP belonging to the new location.

For example, in a case where a staplable MFP is not included in the original location, the user sets stapling unavailable in the setting of a general-purpose driver to be registered in the PC. When the PC is moved to a new location in this state, stapling is set as unavailable in the device setting of the registered printer driver, despite that a staplable MFP is included in the new location. Accordingly, the user cannot use a stapling unless the user manually changes the device setting of the registered printer driver to the staplable setting each time the user moves across locations.

In contrast, there is also conceivable a solution in which all the settings for print performance of a general driver registered in the PC are kept ON. In such a case, moving to new location leaves all the printer functions selectable, whereby it turns out that a print function unavailable in the location remains selectable.

SUMMARY OF THE INVENTION

According to one aspect of the present invention, a management server configured to be connected, via a network, to a plurality of image forming devices and an information processing device having a printer driver is provided. The management server comprising: one or more memories; and one or more processors that execute a set of instructions to: manage, for each location, network information and information of a print performance of an image forming device belonging to the location; identify a location to which the information processing device belongs, based on the network information being managed, upon receiving from the information processing device a notification that a network setting of the information processing device has been changed; and transmit, to the information processing device, a device setting of the printer driver based on the information of a print performance corresponding to an image forming device belonging to the location being identified.

Further features of the present invention will become apparent from the following description of exemplary embodiments with reference to the attached drawings.

BRIEF DESCRIPTION OF THE DRAWINGS

FIGS. 5A and 5B illustrate a sequence of processes as a whole according to an embodiment of the present disclosure.

DESCRIPTION OF THE EMBODIMENTS

Figure 1:
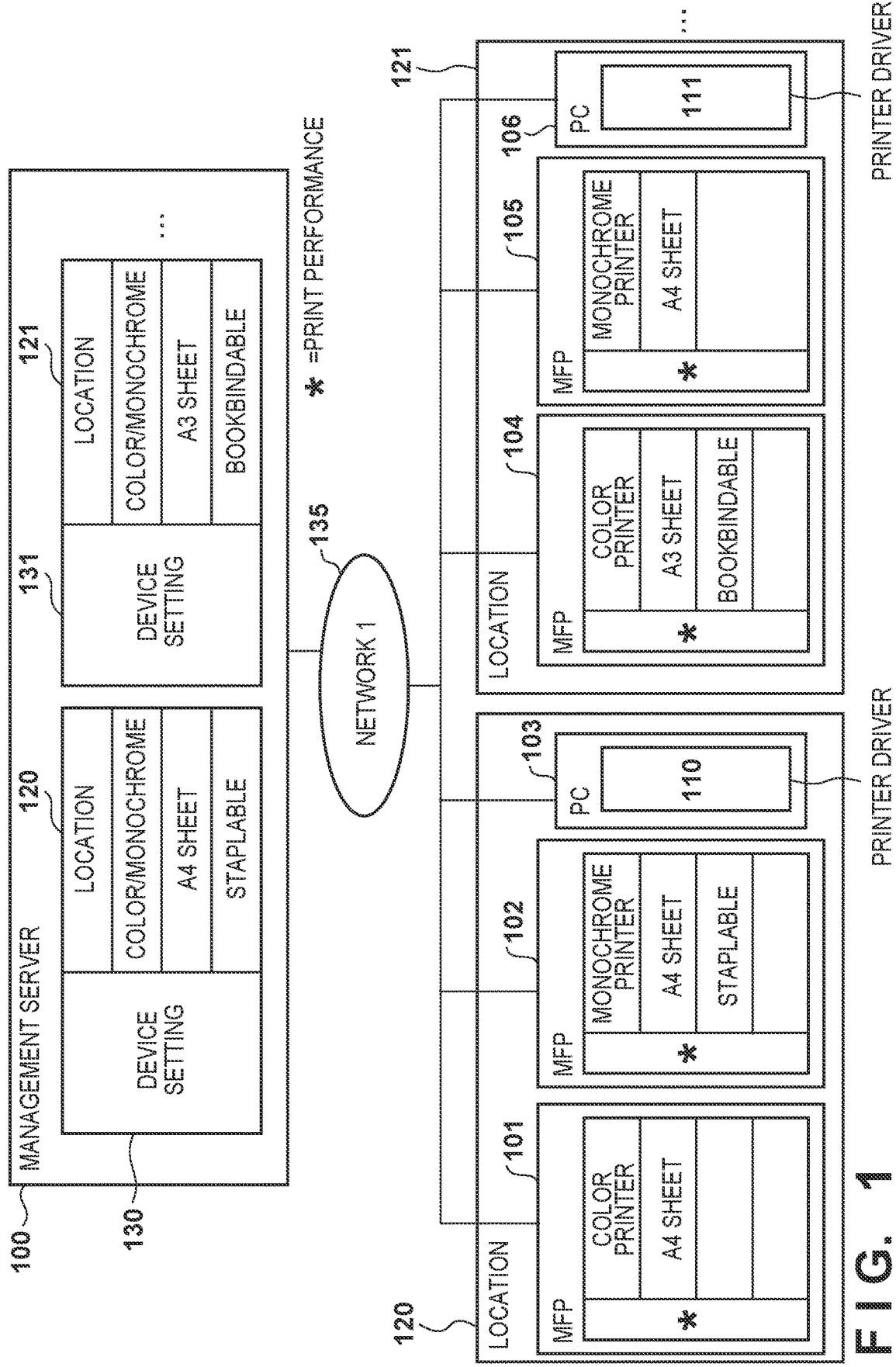
FIG. 1 illustrates an example of an overall configuration of a system according to an embodiment of the present disclosure.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

System Configuration

FIG. 1 illustrates an example of an overall configuration of an image forming system according to an embodiment of the present disclosure. A Multi-Function Peripheral (MFP) and a Personal Computer (PC) are connected to a management server 100 via a network 135. The management server 100 has registered therein MFPs 101, 102, 104 and 105, and PCs 103 and 106. Note that, although the present embodiment is described taking as an example two locations in which the MFP and the PC are located, there may be a larger number of locations included. In addition, also the numbers of MFPs and PCs are not limited to those illustrated in FIG. 1. In addition, although the image forming device according to the present embodiment is described taking as an example an MFP, other types of image forming devices may be used, such as for example a network printer having only a print function. Other types of information processing terminals besides PCs, such as smartphones, mobile devices, or the like may also be used.

The management server 100 is a server that performs management of a network setting of MFPs and PCs and a print performance of the MFP, and job management. Management of an MFP to be managed by the management server 100 may be started in response to a registration request from the MFP, for example. In addition, the management server 100 manages locations. FIG. 1 of the present embodiment illustrates a state in which the MFPs 101 and 102, and the PC 103 belong to a location 120. FIG. 1 also illustrates a states in which the MFPs 104 and 105, and the PC 106 belong to a location 121. Information (location settings) of locations to which respective devices belong are supposed to be registered and managed by the management server 100. Location settings are intended to group PCs and MFPs belonging to a same location using network information such as a specific range of IP addresses, host names, or the like. Accordingly, locations are not necessarily defined in terms of physical distances or positional relations.

In addition, the management server 100 holds the device settings of printer drivers for each location. FIG. 1 illustrates an example in which device settings 130 and 131 corresponding to the locations 120 and 121 are held. The device setting, existing one for each location, is set as appropriate for a printer driver of a PC belonging to the location. The device setting includes configurable setting items associated with the print function of each MFP, and setting values for the setting items.

A device setting will be specifically described, referring to the example of FIG. 1. To the location 120 belong the MFPs 101 and 102. On this occasion, FIG. 1 illustrates that the MFP 101 is a "color printer" in terms of print performance, with "A4 sheet" being the maximum printable sheet size. In addition, FIG. 1 illustrates that the MFP 102 is a "monochrome printer", with "A4 sheet" being the maximum printable sheet size. Furthermore, FIG. 1 illustrates that the MFP 102 may have a setting item "stapling" set therein as a finishing function. Based on such printing performance, the management server 100 holds a device setting 130 of "color/monochrome," "A4 sheet", "staplable," as the device setting for location 120. A device setting 131 is similarly held in association with the MFP belonging to the location 121.

In addition, the management server 100 holds a job list (not illustrated) for each location. The job list has registered therein jobs generated in response to a request from a PC or the like. A method for registering a job will be described later.

Each MFP is registered in the management server 100 and connected to the management server 100 via a network 135. In addition, each MFP manages, and provides the management server 100 with, information respectively relating to the print performance of the MFP. Each PC is registered in the management server 100 and connected to the management server 100 via the network 135. The PCs 103 and 106 respectively hold printer drivers 110 and 111, which are general drivers. In each PC, the printer driver is used by a user as a destination of print instruction when using pull print.

Hardware Configuration

Figure 2:
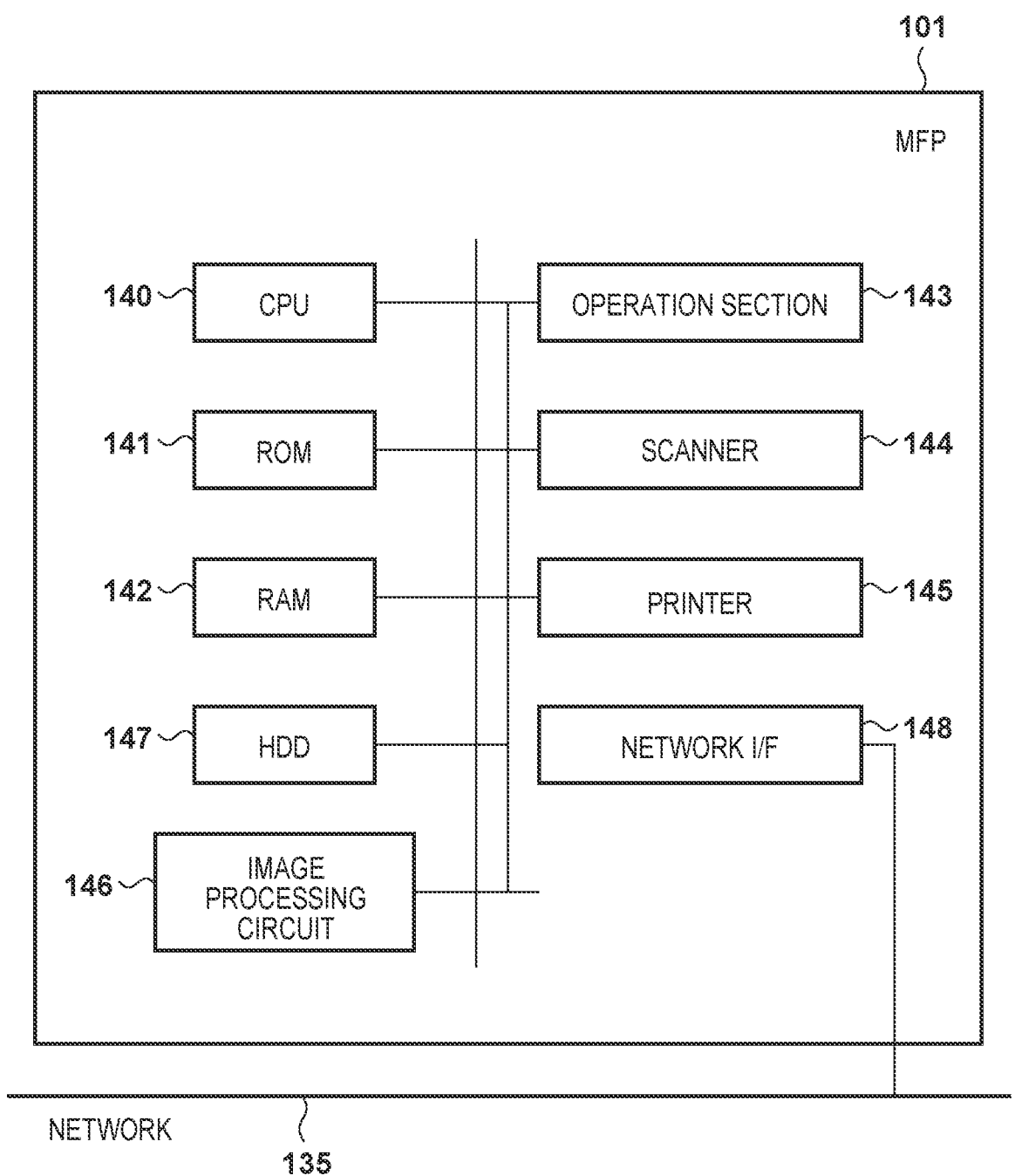
FIG. 2 illustrates an example of a hardware configuration of an MFP according to an embodiment of the present disclosure.

FIG. 2 illustrates a hardware configuration of an MFP in the image forming system according to the present embodiment. The present embodiment is described as using four MFPs, the MFP 101 of which is described here as a representative. In addition, the present embodiment is described assuming that each MFP differs in print performance (function), and therefore including parts and details of configurations may be different in accordance with the function.

A CPU 140 collectively controls access to various devices based on a control program stored in a ROM 141 or a hard disk (HDD) 147. The ROM 141, which is a non-volatile storage area, stores a control program or the like, which is executable by the CPU 140. A RAM 142, which mainly works as a main memory, a work area, or the like of the CPU 140, may be configured to be expandable in storage capacity with an optional RAM connected to an expansion port (not illustrated). An image processing circuit 146 performs various image processing on arbitrary image data. The type of image processing here is not intended to be particularly limiting, and there may be mentioned a conversion process for performing printing process by a printer 145, for example.

The HDD 147, which is a non-volatile storage area, stores a boot program, various applications, font data, user files, edit files, or the like. Here, although the present embodiment describes an example using the HDD 147, an SD card, a flash memory, or the like may be used as an external storage device besides the HDD 147. A scanner 144 is a reading unit configured to read an original document and generates a read image. The printer 145 is a printing unit configured to perform a printing operation based on predetermined image data. An operation unit 143 performs receiving input from a user via a User Interface (UI) and displaying the UI. A network I/F 148 is an interface configured to perform data communication with an external device via the network 135.

Figure 3:
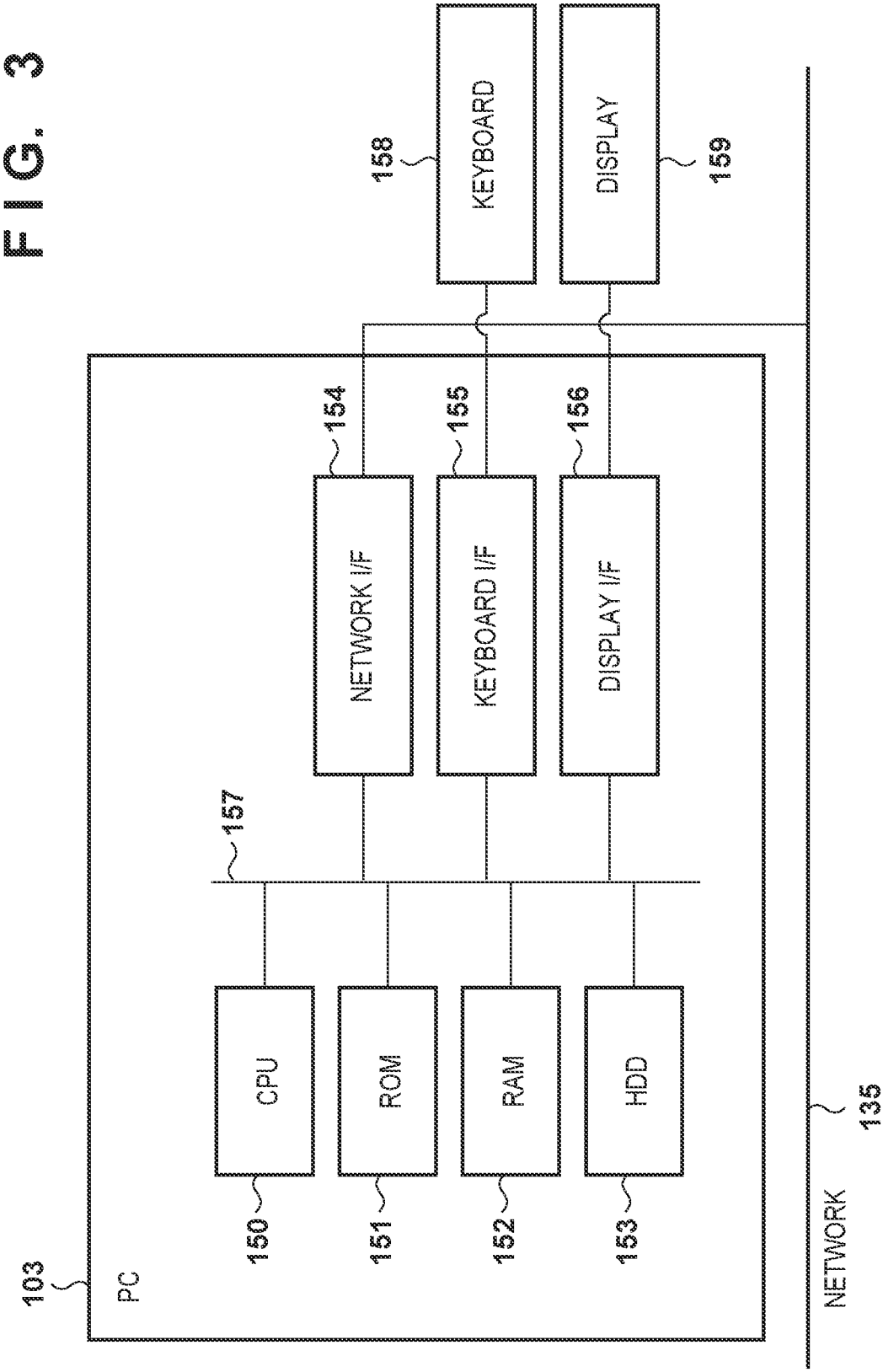
FIG. 3 illustrates an example of a hardware configuration of a PC according to an embodiment of the present disclosure.

FIG. 3 illustrates an example of a hardware configuration of a PC as an information processing device in the image forming system according to the present embodiment. FIG. 1 illustrates two PCs, the PC 103 of which is described as a representative. Here, each PC may include a different part. A CPU 150 collectively controls access to various devices based on a control program stored in a ROM 151 or an HDD 153. The ROM 151 stores a control program or the like, which is executable by the CPU 150. A RAM 152, which mainly works as a main memory, a work area, or the like of the CPU 150, may be configured to be expandable in storage capacity with an optional RAM connected to an expansion port (not illustrated).

The HDD 153 stores a boot program, various applications, font data, user files, edit files, or the like. Here, although the present embodiment uses the HDD 153, an SD card, a flash memory, or the like may be used as an external storage device besides the HDD 153. A system bus 157 is a bus configured to communicatively connect each part in the PC 103. A network I/F 154 is an interface configured to perform data communication with an external device via the network 135. A keyboard I/F 155 is an interface configured to control key input from a keyboard 158 or a pointing device (not illustrated). A display I/F 156 is an interface configured to control display of a display 159.

Figure 4:
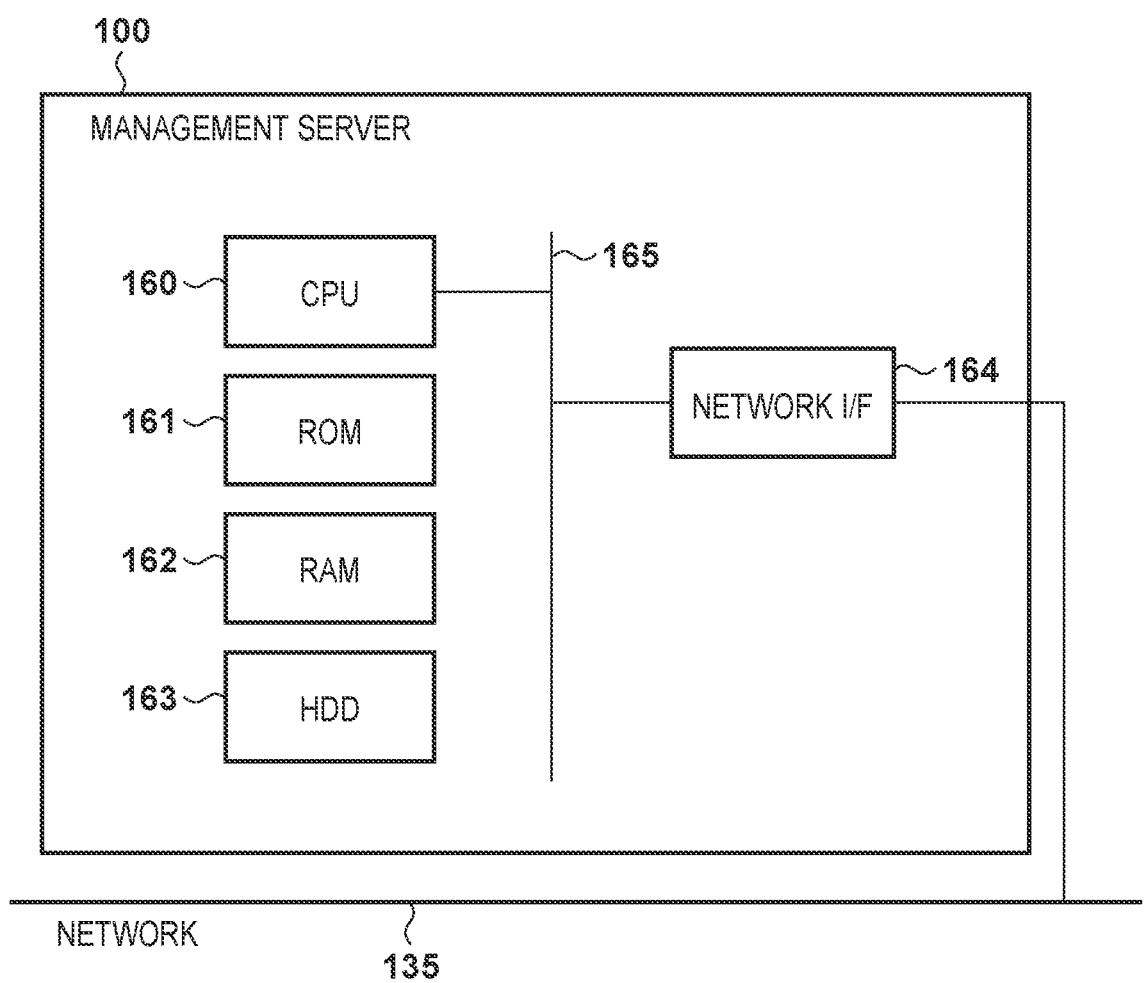
FIG. 4 illustrates an example of a hardware configuration of a management server according to an embodiment of the present disclosure.

FIG. 4 is a block diagram illustrating an example of a hardware configuration of the management server 100 of the image forming system according to the present embodiment. A CPU 160 collectively controls access to various devices based on a control program stored in a ROM 161 or an HDD 163. The ROM 161 stores a control program or the like, which is executable by the CPU 160. A RAM 162, which mainly works as a main memory, a work area, or the like of the CPU 160, may be configured to be expandable in storage capacity with an optional RAM connected to an expansion port (not illustrated). The HDD 163 stores a boot program, various applications, font data, user files, edit files, or the like. Here, although the present embodiment uses the HDD 163, an SD card, a flash memory, or the like may be used as an external storage device besides the HDD 163. A system bus 165 is a bus configured to communicatively connect each part in the management server 100. A network I/F 164 is an interface configured to perform data communication with an external device via the network 135.

Processing Sequence

There will be described a flow of an operation of the entire system according to the present embodiment. FIGS. 5A and 5B illustrate a sequence of a flow of the entire system according to the present embodiment. Processes in respective devices are realized by reading and executing programs stored in a ROM or the like, by the CPU included in the aforementioned device configuration. In addition, although description of FIGS. 5A and 5B is provided taking the MFP 101 and PC 103 as an example, it is intended that other devices also perform similar processes.

At S101, the MFP 101 transmits a print performance and a network setting of the MFP 101 to the management server 100. The processing in this procedure will be described in detail, referring to FIG. 6.

At S102, the management server 100, upon receiving the print performance and the network setting from the MFP 101, identifies location of the MFP 101 from the network setting, using an IP address or a host name. The management server 100 has information about locations preliminarily set therein. Information about a location has a range of IP addresses and host names set therein. For example, a range of IP addresses "192.168.1.1" to "192.168.1.254" is set for the location 120. In addition, a range of IP addresses "192.168.2.1" to "192.168.2.254" is set for the location 121. The management server 100 acquires the IP address of the MFP 101 from the received network setting of the MFP 101, and identifies the location to which the MFP 101 belongs. On this occasion, the MFP 101 and the location to which the MFP 101 belongs may be managed by associating with each other, based on the identification result.

At S103, the management server 100 updates the device setting 130 of the identified location 120. Details of the update method for the device setting 130 here will be described below, referring to FIGS. 7 and 8.

At S104, the PC 103, upon detecting a change made to the network to which the PC 103 belongs, notifies the management server 100 of the change. For example, the PC 103 may detect that the network is changed, when a change of setting with regard to the network is made by an instruction from a user, an external device, or the like.

At S105, the management server 100 acquires an IP address or a host name from the network setting received from the PC 103, and identifies the location corresponding thereto. Identification is performed here by referring to the information about the location which has been set in the management server 100.

At S106, the management server 100 transmits the device setting of the location identified at S105 to the PC 103 as a response to the detection notification provided at S104. Here, the PC 103 is provided with a device setting corresponding to one or more MFPs belonging to a location after the PC 103 has moved thereto.

At S107, the PC 103 updates the device setting of the printer driver 110 using the device setting received from the management server 100.

At S108, the PC 103 detects a print request triggered by a print instruction from a user to the printer driver 110. The print instruction mentioned here includes, for example, performing an instruction from an arbitrary application (not illustrated) installed in the PC 103, to print document data. The print instruction includes a print setting used by a job. In addition, when receiving the printing setting, the printer driver 110 displays items and initial values of the print setting on the UI, based on the device setting provided in association with the location.

At S109, the PC 103 transmits bibliographic information of the job to the management server 100. Bibliographic information, which is setting information of a job such as number of sheets or size of the job, color, job name, or the like, does not include the print data itself to be printed by the job. In the present embodiment, the job body is withheld in a spool (not illustrated) of the printer driver 110 of the PC 103.

At S110, the management server 100 adds the job corresponding to the bibliographic information to a job list for a location 120 including the PC 103 that has transmitted the bibliographic information.

At S111, the MFP 101 receives a job list display request by a UI operation on the operation unit 143 performed by the user. A job list display request is issued when, for example, a user logs in via the operation unit 143 of the MFP 101 and the user requests to display a screen listing printable jobs.

At S112, the MFP 101 transmits a job list acquisition request to the management server 100 in response to receiving the job list display request at S111.

At S113, the management server 100 identifies the location of the MFP 101 in response to receiving the job list acquisition request from the MFP 101 at S112.

At S114, the management server 100 transmits, to the MFP 101, a job list of the location identified at S113. The job list also includes information for identifying a PC holding respective jobs. The information for identifying a PC includes an IP address or the like of the PC.

At S115, the MFP 101 displays the received job list on a UI (not illustrated) of the operation unit 143. On this occasion, jobs are displayed on the UI in a selectable manner from the job list. In addition, information of a user or a PC that has submitted the job, or bibliographic information of the job may be displayed together.

At S116, the MFP 101 detects that one or more jobs have been selected from the job list by the operation unit 143, and that a print instruction for the jobs has been issued. For example, a job may be selected on the UI, and a print instruction may be detected in response to depression of a predetermined button (not illustrated).

At S117, the MFP 101 identifies an IP address of the PC 103 holding the selected job from the information included in the job list acquired at S114 and transmits a job acquisition request to the PC 103 using the IP address.

At S118, the PC 103 transmits, to the MFP 101, a job including the print data withheld in the spool of the printer driver 110, as a response to the job acquisition request received from the MFP 101 at S117.

At S119, the MFP 101 performs the printing process, using the print data included in the job received from the PC 103 at S118. The printing process may be performed based on the bibliographic information transmitted at S109. Note that a change of the print setting may be received when receiving the print instruction at S116, in which case the job may be executed based on the changed setting.

At S120, the PC 103, after having transmitted the job to the MFP 101 at S118, deletes the job withheld in the spool of the printer driver 110 of the PC 103. On this occasion, when deleting a job, history information about the process of the job may be held. For example, information as to whether or not the job successfully completed, or information of the MFP that performed the job may be held as history information.

At S121, the PC 103 transmits, to the management server 100, a request to delete, from the job list of the location, the bibliographic information of the job transmitted at S118.

At S122, the management server 100 deletes, in accordance with the bibliographic information deletion request received from the MFP 101 at S121, the bibliographic information of the job of deletion request from the job list of the location. Then, this process sequence is terminated.

The processes from S101 to S110 and from S111 to S122 of FIGS. 5A and 5B may be performed asynchronously. In other words, the process from S101 to S110 may be initiated triggered by the process at S101 (the process in FIG. 6 described below). On the other hand, the process from S111 to S122 may be initiated at a timing at which detection has been made at S111.

In addition, the process from S120 to S122 may be performed in accordance with the result of the printing process by the MFP 101 at S119. For example, deletion of a job or the like may be performed in accordance with successful completion of the printing process.

In the following, processing by each device will be described referring to the drawings, based on the process sequence of FIGS. 5A and 5B. The following flowchart will be described in association with each of the processes illustrated in FIGS. 5A and 5B.

Information Transmission Process

Figure 6:
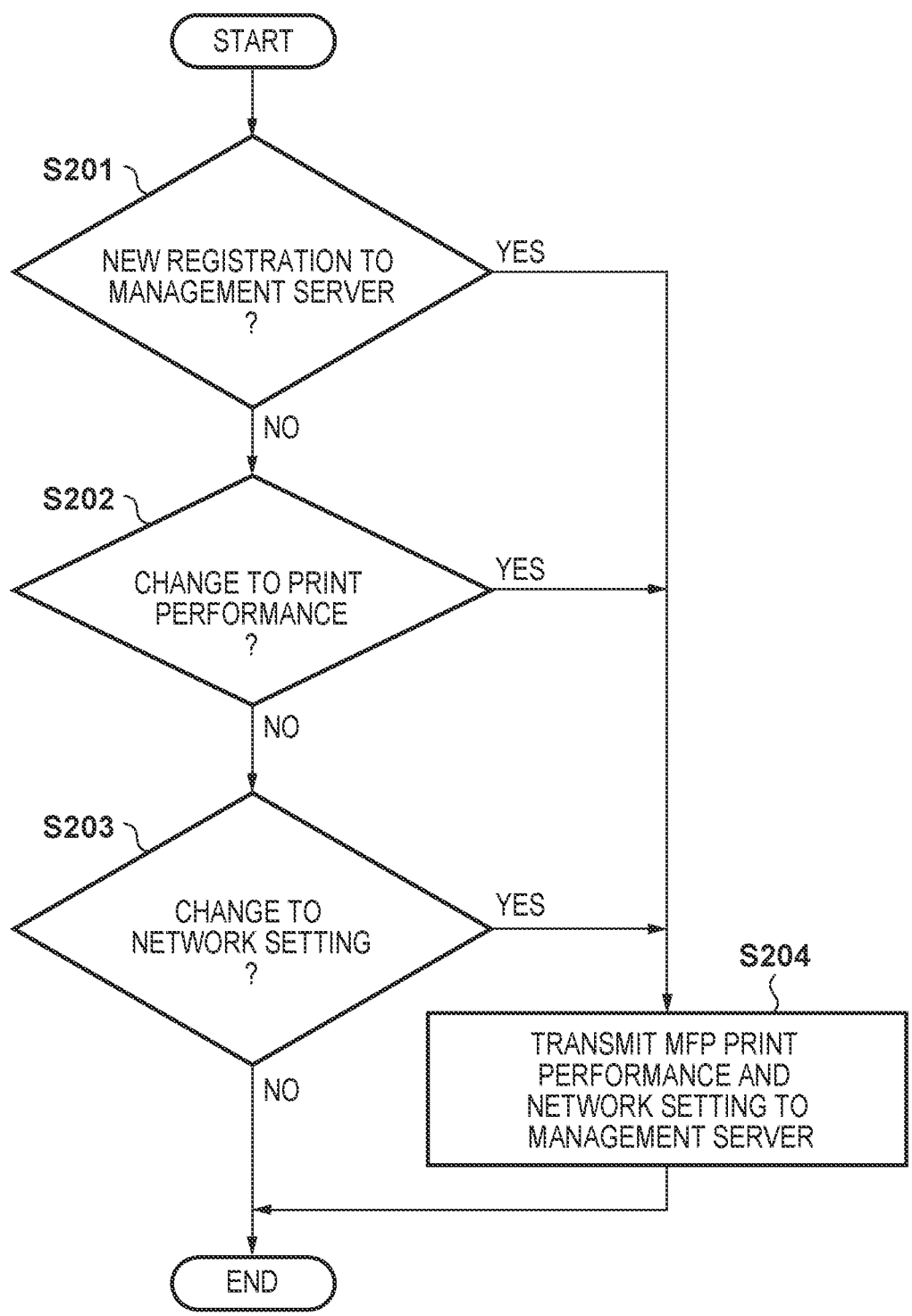
FIG. 6 is a flowchart of a transmission process of an MFP according to an embodiment of the present disclosure.

FIG. 6 is a flowchart illustrating a process for transmitting a print performance and a network setting in the MFP 101 according to the present embodiment. The process may be initiated at a regular time interval after the MFP 101 is activated, or may be performed upon occurrence of a predetermined event (reception of setting change, activation of device, or the like).

At S201, the MFP 101 checks whether or not an operation of newly registering the MFP 101 to the management server 100 has been performed. The new registration may be instructed by, for example, accessing the management server 100 via a predetermined UI (not illustrated) when newly installing the MFP 101. When there is a new registration (YES at S201), the process flow proceeds to S204, otherwise (NO at S201) the process flow proceeds to S202.

At S202, the MFP 101 checks whether or not the print performance has been changed. For example, a change in presence or absence of stapling or a bookbinding finishing due to addition or removal of a finisher to or from the MFP 101 may fall within. In other words, the MFP 101 may be configured to be functionally expansive, whereby its functionality may vary. When the print performance is changed (YES at S202), the process flow proceeds to S204, otherwise (No at S202) the process flow proceeds to S203.

At S203, the MFP 101 checks whether or not the network setting has been changed. Change in the network setting includes, for example, a case where the IP address of the MFP is changed. When the network setting is changed (YES at S203), the process flow proceeds to S204, otherwise (NO at S203) the present process flow is terminated.

At S204, the MFP 101 transmits its print performance and network setting to the management server 100. Triggered by the transmission process, the processes at and after S101 of FIGS. 5A and 5B will be performed. Then, the present processing flow is terminated.

Setting Updating Process

Figure 7:
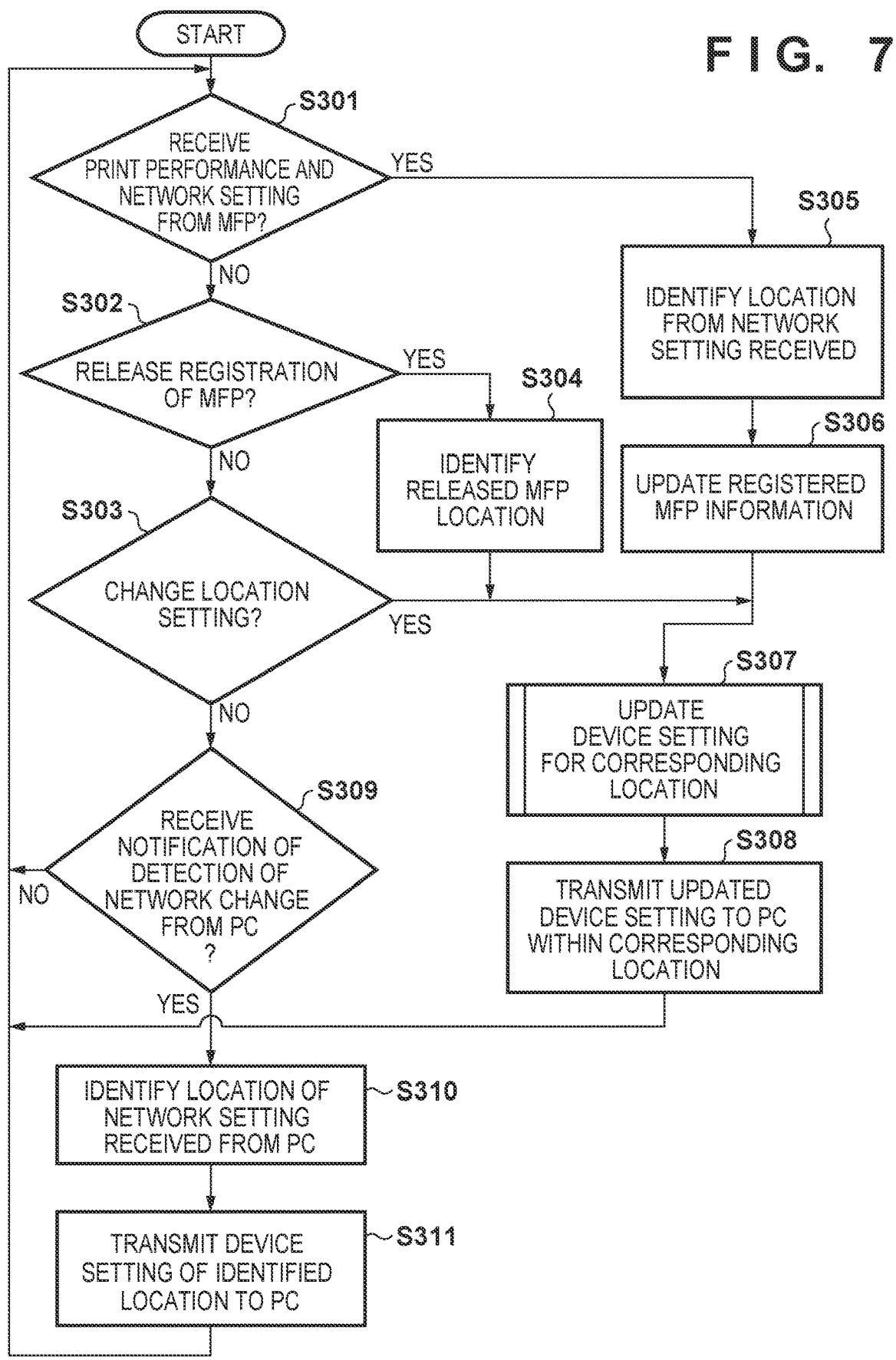
FIG. 7 is a flowchart of an updating process in a management server according to an embodiment of the present disclosure.

FIG. 7 is a flowchart illustrating an updating process of the device setting of the printer driver in the management server 100 according to the present embodiment. The present process flow corresponds to the processes from S102 to S106 of FIG. 5A.

At S301, the management server 100 checks whether or not a print performance and a network setting have been received from the MFP 101. When respective pieces of information are received (YES at S301), the process flow proceeds to S305, otherwise (NO at S301), the process flow proceeds to S302.

At S302, the management server 100 checks whether or not registration of the MFP registered in the management server 100 has been released. Registration is released by, for example, performing an operation to release registration of the MFP on a management screen (not illustrated) of the management server 100. Alternatively, registration may be released in response to issuing a release request from the MFP. When the MFP has been released (YES at S302), the process flow proceeds to S304, otherwise (NO at S302) the process flow proceeds to S303.

At S303, the management server 100 checks whether or not the location setting registered in the management server 100 has been changed. For example, a check is performed as to whether or not there has been a change in the range of IP addresses, addition or deletion of IP addresses, or the like. When the location setting has been changed (YES at S303), the process flow proceeds to S307, otherwise (NO at S303) the process flow proceeds to S309.

At S304, the management server 100 identifies the location of the released MFP. Subsequently, the process flow proceeds to S307.

At S305, the management server 100 identifies the location of the MFP 101 from the received network setting.

At S306, the management server 100 updates the information of the MFP 101 registered in the management server 100, based on the received print performance and network setting.

At S307, the management server 100 updates the device setting of the printer driver at the location registered in the management server 100. Details of the updating process will be described below, referring to FIGS. 8A and 8B. Subsequently, the process flow proceeds to S308.

At S308, the management server 100 transmits the updated device setting to the PC within the corresponding location. Then, the process flow returns to S301, from which the process is repeated.

At S309, the management server 100 checks whether or not a notification of detection of network change has been received from the PC (S309). The aforementioned notification of detection corresponds to the notification of detection received in the process at S104 of FIG. 5A. When the notification of detection has not been received, the process flow returns to the start of the flow in order to check occurrence of the updating process.

At S310, the management server 100 identifies the location 120 to which the PC 103 belongs, based on the network setting received from the PC 103.

At S311, the management server 100 transmits, to the PC 103, the device setting 130 of the location 120 identified at S310. Subsequently, the process flow returns to S301, from which the process is repeated.

Device Setting Updating Process of Management Server

Figure 8A:
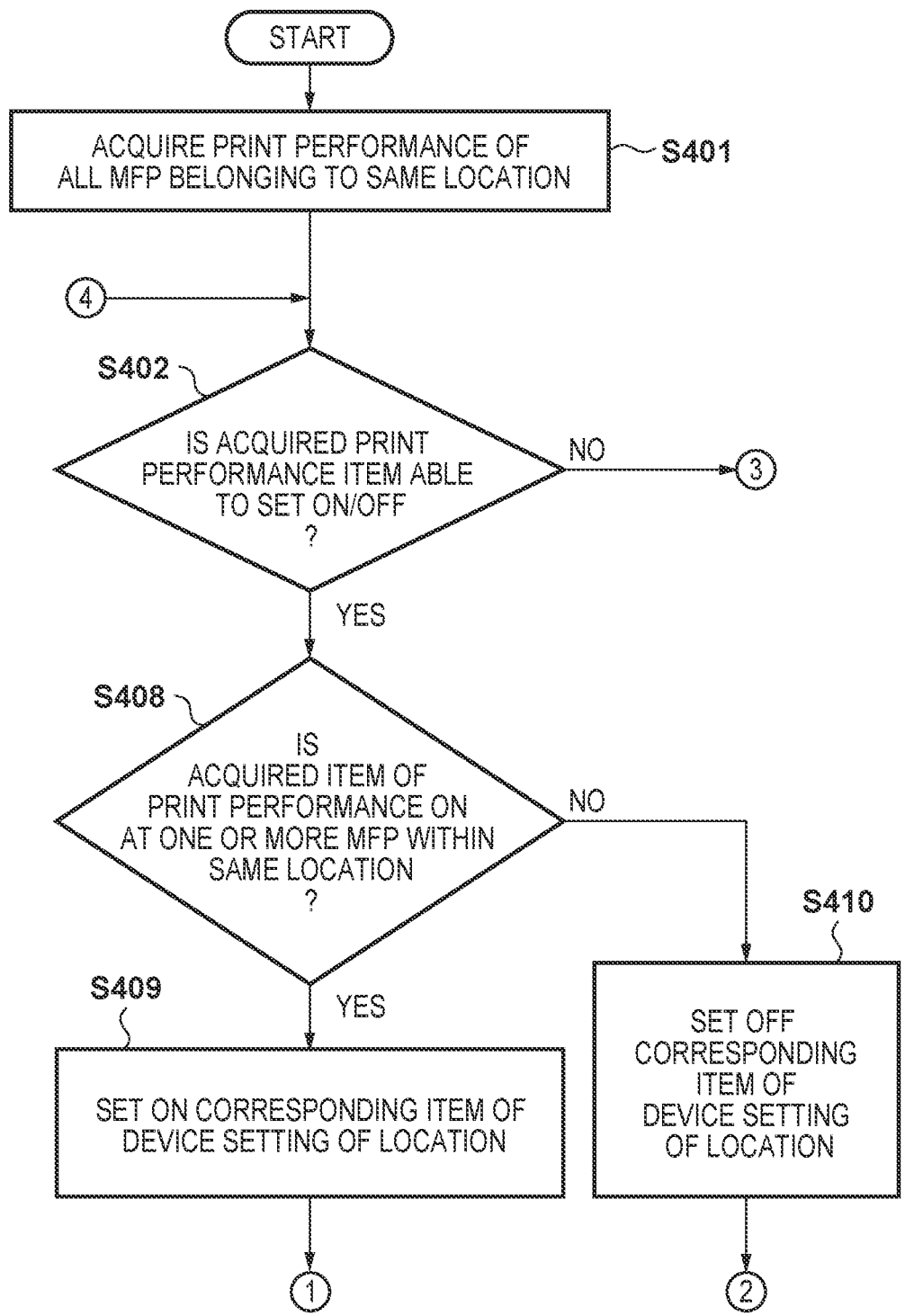
FIGS. 8A and 8B show a flowchart of an updating process of a device setting in a management server according to an embodiment of the present disclosure.
Figure 8B:
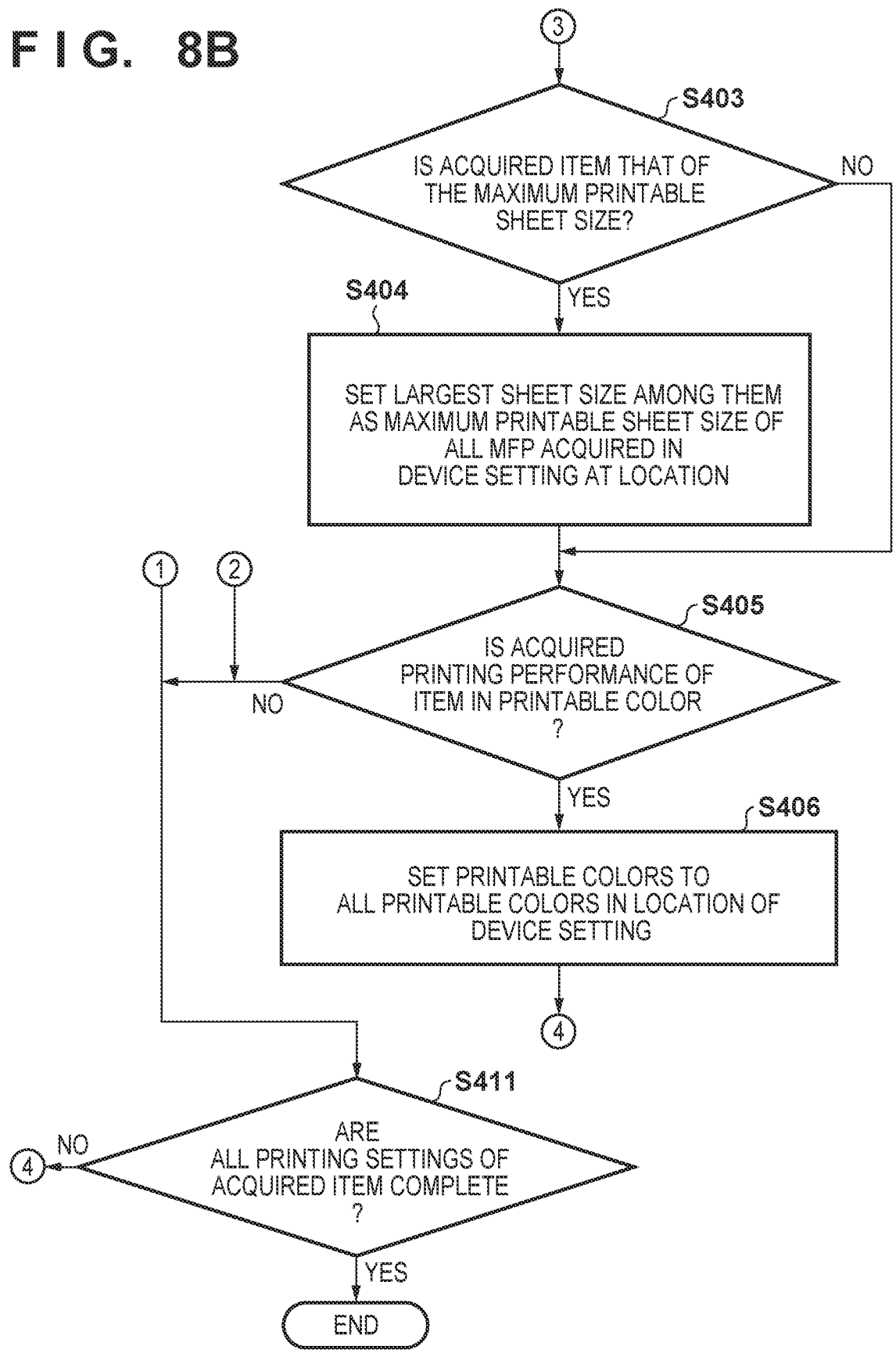

FIGS. 8A-8B show a flowchart illustrating details of process of updating, in the management server 100, the device setting of the printer driver at a corresponding registered location. The present process flow corresponds to the procedure at S307 of FIG. 7.

At S401, the management server 100 acquires the print performance of all the MFPs belonging to a same location 120 as the corresponding location.

At S402, the management server 100 focuses on an item of the print performance of the acquired MFP. Then, the management server 100 checks whether or not the item of the acquired print performance is settable in an ON-or-OFF manner. For example, the staple setting of print material is settable in an ON-or-OFF manner such as "ON" when staplable and "OFF" when not staplable. When there is an item which is not settable in an ON-or-OFF manner (NO at S402), the process flow proceeds to S403, otherwise (YES at S402) the process flow proceeds to S408.

At S403, the management server 100 checks whether or not an item of interest is that of the maximum printable sheet size. When the item of interest is not the setting of the maximum printable sheet size (NO at S403), the process flow proceeds to S405, otherwise (YES at S403), the process flow proceeds to S404.

At S404, the management server 100 checks the items of the maximum printable sheet size of all the MFPs in the corresponding location acquired at S401, and sets the largest sheet size among them as the maximum printable sheet size of the device setting 130. Subsequently, the process flow proceeds to S405.

At S405, the management server 100 checks whether or not the acquired item of print performance is an item of printable colors. The values of the item of printable colors is, for example, "monochrome" for a monochrome printer, and "monochrome" and "color" for a full color printer. When the acquired item of print performance is not the item of printable colors (NO at S405), the process flow proceeds to S411, otherwise (YES at S405) the process flow proceeds to S406.

At S406, the management server 100 checks the item of printable colors of all the MFPs in the corresponding location acquired at S401, and sets all the available colors to the item of printable colors of the device setting 130. Specifically, when an MFP that can print in "color" and "monochrome" belongs to the location, "color" and "monochrome" are set as printable colors. When, on the other hand, an MFP that can print only in "monochrome" belongs to the location, "monochrome" is set as a printable color. Subsequently, the process flow proceeds to S402, from which the process is repeated.

At S408, the management server 100 checks whether or not the item of print performance of interest is "ON" at one or more of the MFPs within the same location. When one or more MFPs are "ON" (YES at S408), the process flow proceeds to S409, otherwise (NO at S408) the process flow proceeds to S410.

At S409, the management server 100 sets "ON" to the corresponding item of the device setting 130 of the location. Then, the process flow proceeds to S411.

At S410, the management server 100 sets "OFF" to the corresponding item of the device setting 130 of the location. Subsequently, the process flow proceeds to S411.

At S411, the management server 100 checks whether or not all the items acquired at S401 have been set. When there are yet-to-be-set items (NO at S411), the process flow returns to S402, from which the process is repeated as yet-to-be-set items to be an item of interest. When the process has completed for all the items (YES at S411), the present process flow is terminated.

The present process flow allows for setting the device setting 130 in a manner suitable for using the MFPs belonging to the location 120.

Device Setting Updating Process of PC

Figure 9:
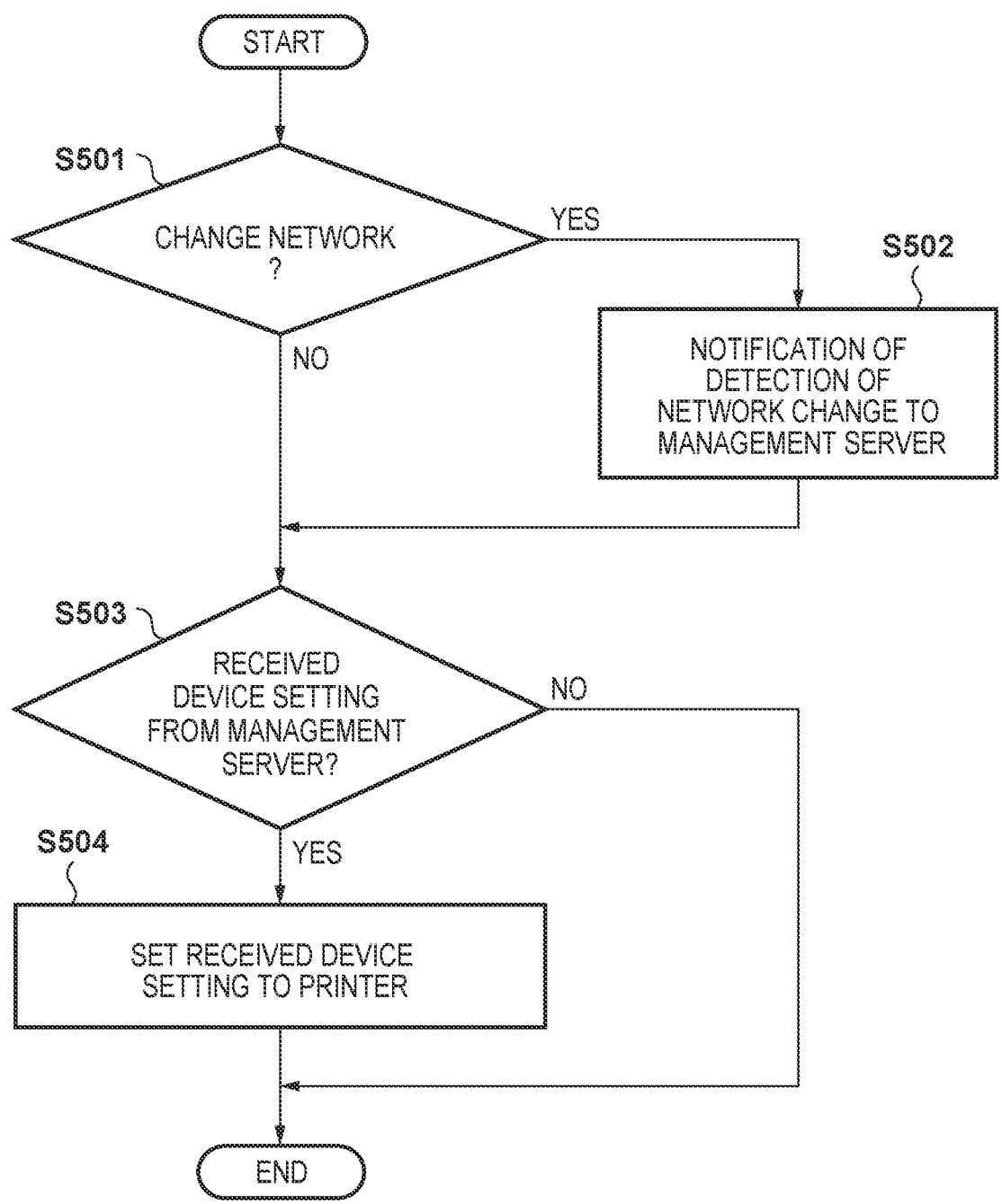
FIG. 9 is a flowchart of an updating process of a device setting in a PC according to an embodiment of the present disclosure.

FIG. 9 is a flow chart illustrating an updating process of the device setting of a printer driver suitable for a current location in the PC 103 according to the present embodiment. The present process flow corresponds to the processes from S104 to S107 of FIG. 5A.

At S501, the PC 103 checks whether or not the network to which the PC 103 is connected has been changed. For example, let us assume that the PC 103 which has been originally connected to a network corresponding to the location 120 is disconnected therefrom and newly-connected to a network corresponding to the location 121. In this case, an IP address included in the range of the location 121 is provided from a Dynamic Host Configuration Protocol (DHCP) server (not illustrated) to the PC 103. Then, the IP address of the PC 103 is changed to the provided IP address. When the network is changed (YES at S501), the process flow proceeds to S502, otherwise (NO at S501) the process flow proceeds to S503.

At S502, the PC 103 transmits a network change detection notification to the management server 100. The detection notification corresponds to S104 of FIG. 5A. Subsequently, the process flow proceeds to S503.

At S503, the PC 103 checks whether or not the device setting of the printer driver has been received from the management server 100. Reception of the device setting here corresponds to S106 of FIG. 5A. When the device setting is received (YES at S503), the process flow proceeds to S504, otherwise (NO at S503) the present process flow is terminated.

At S504, the PC 103 sets or updates the device setting of the printer driver 110 registered in the PC 103, using the received device setting of the printer driver. Then, the present processing flow is terminated.

MFP Printing Process

Figure 10:
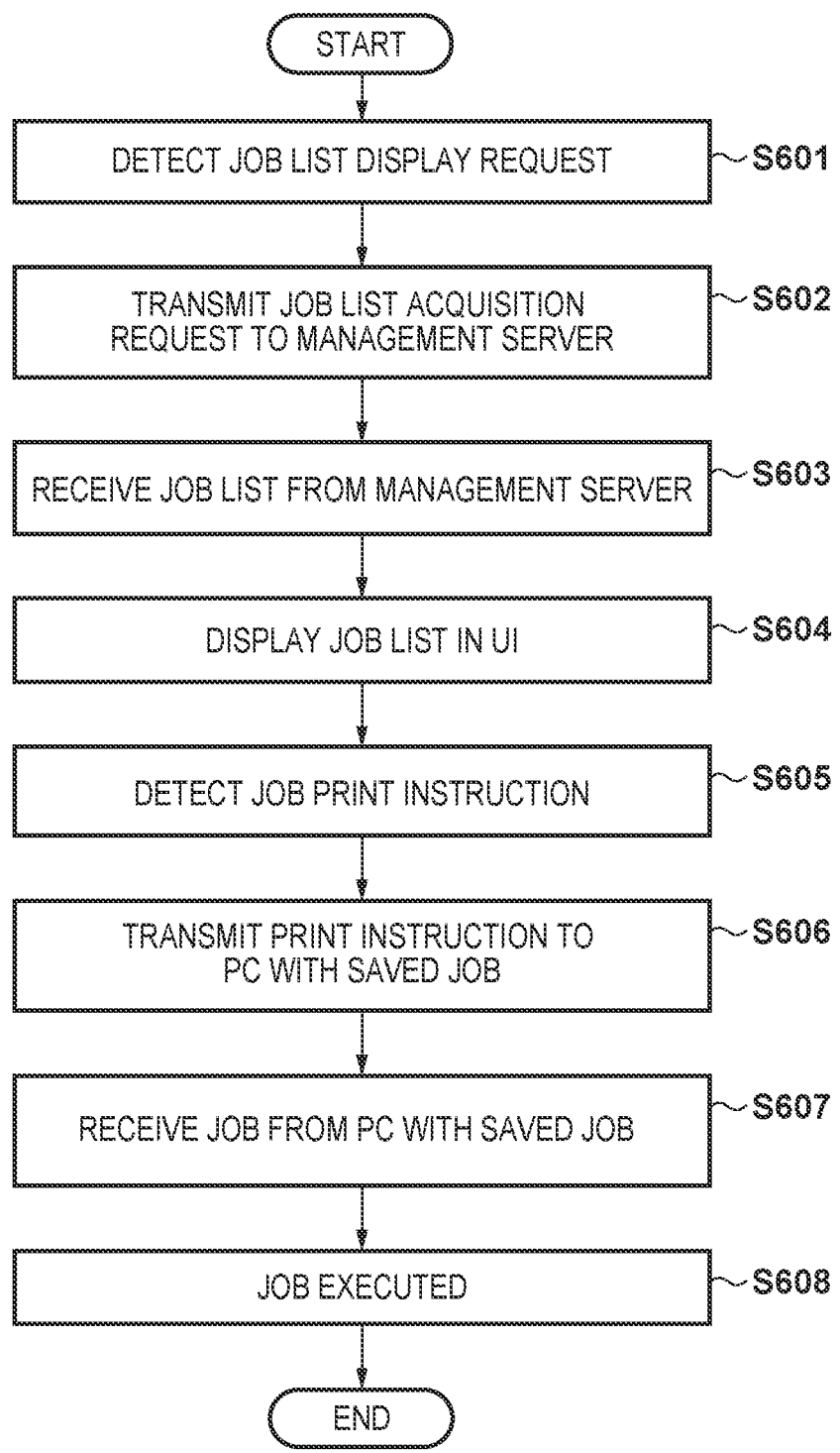
FIG. 10 is a flowchart of a printing process in an MFP according to an embodiment of the present disclosure.

FIG. 10 is a flowchart illustrating a process when performing pull print in the MFP 101 according to the present embodiment. The present process flow corresponds to the processes from S111 to S119 of FIG. 5B.

At S601, the MFP 101 detects a job list display request via a UI operation on the operation unit 143.

At S602, the MFP 101 transmits a job list acquisition request to the management server 100. The job list acquisition request includes the network setting of the MFP 101. The present process corresponds to the process at S112 of FIG. 5B.

At S603, the MFP 101 receives a job list from the management server 100 as a response to the job list acquisition request issued at S602. The job list includes information for identifying the PC in which each job is held.

At S604, the MFP 101 displays the job list received at S603 on the UI of the operation unit 143. The present process corresponds to the process at S115 of FIG. 5B.

At S605, the MFP 101 detects that a job print instruction has been received from a user via a UI operation on the operation unit 143. The present process corresponds to the process at S116 of FIG. 5B.

At S606, the MFP 101 identifies the PC 103 holding the instructed job, referring to the information included in the job list. Then, the MFP 101 transmits a print instruction to the identified PC 103, using the IP address indicated in the job list. The present process corresponds to the process at S117 of FIG. 5B.

At S607, the MFP 101 receives a job from the PC 103 as a response to the print instruction. The present process corresponds to the process at S118 of FIG. 5B.

At S608, the MFP 101 performs printing of the job received from the PC 103 at S607. The present process corresponds to the process at S119 of FIG. 5B. Then, the present processing flow is terminated.

Printing Process of PC

Figure 11:
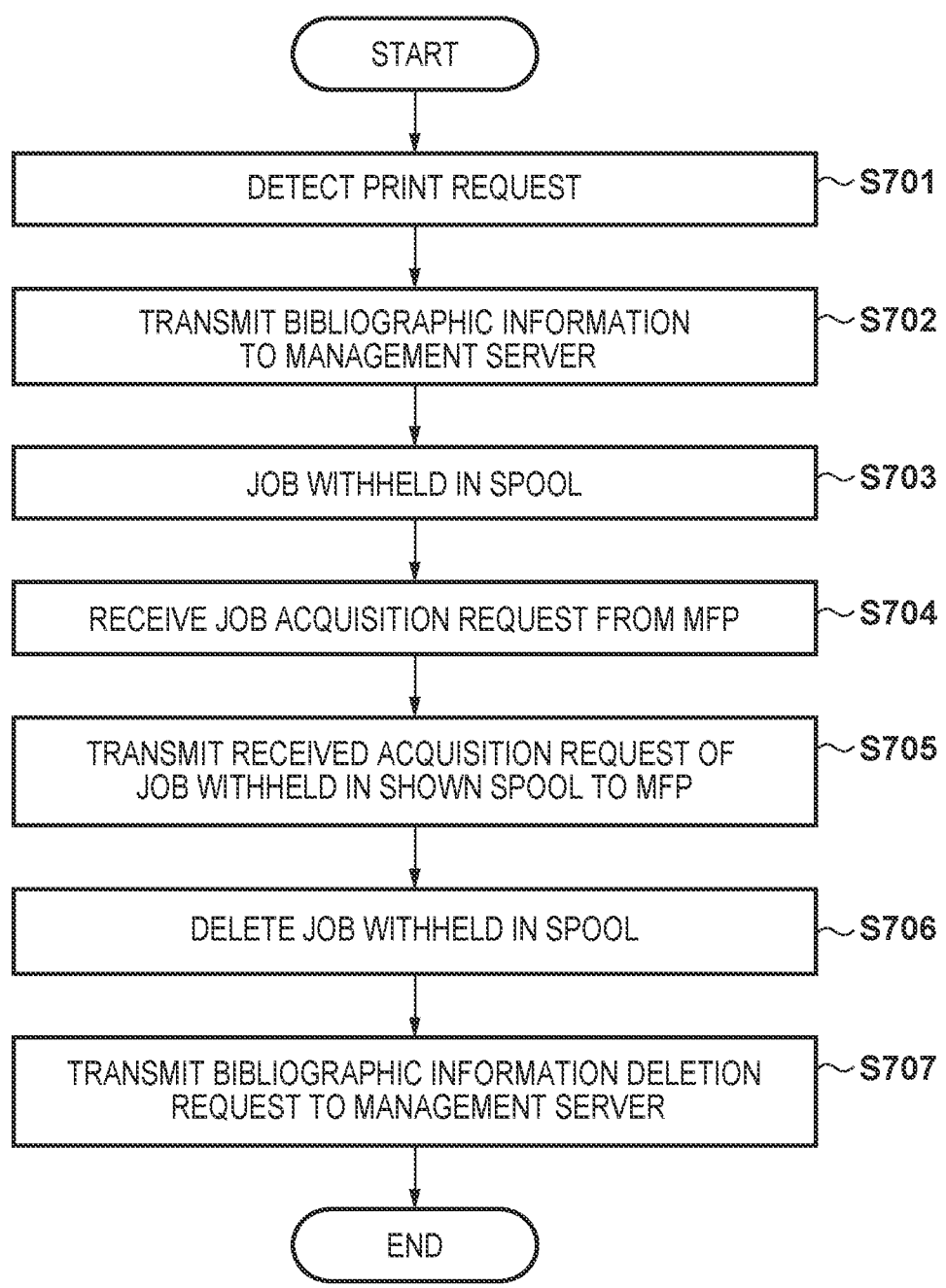
FIG. 11 is a flowchart of a printing process in a PC according to an embodiment of the present disclosure.

FIG. 11 is a flowchart illustrating a process when performing pull print in the PC 103 according to the present embodiment. The present process flow corresponds to the processes from S108 to S121 of FIGS. 5A-5B.

At S701, the PC 103 detects that a print request has been issued by a print instruction from the user to the printer driver 110. The present process corresponds to the process at S108 of FIG. 5A.

At S702, the PC 103 transmits, to the management server 100, bibliographic information of the job corresponding to the print request received at S701. The bibliographic information includes a network setting (such as IP address) of the PC 103. The present process corresponds to the process at S109 of FIG. 5A.

At S703, the PC 103 withholds, in a spool (not illustrated) of the printer driver 110 of the PC 103, the job body corresponding to the print request received at S701.

At S704, the PC 103 receives a job acquisition request from the MFP 101. The present process corresponds to the process at S117 of FIG. 5B.

At S705, the PC 103 transmits, to the MFP 101, a job corresponding to the acquisition request received at S704, among the jobs withheld in the spool at S703. The present process corresponds to the process at S118 of FIG. 5B.

At S706, the PC 103 deletes the job transmitted at S705, among the jobs withheld in the spool. The present process corresponds to the process at S120 of FIG. 5B.

At S707, the PC 103 transmits, to management server 100, a request to delete the job transmitted at S705 from the job list of management server 100. The present process corresponds to the process at S121 of FIG. 5B. Then, the present processing flow is terminated.

Printing Process of Management Server

Figure 12:
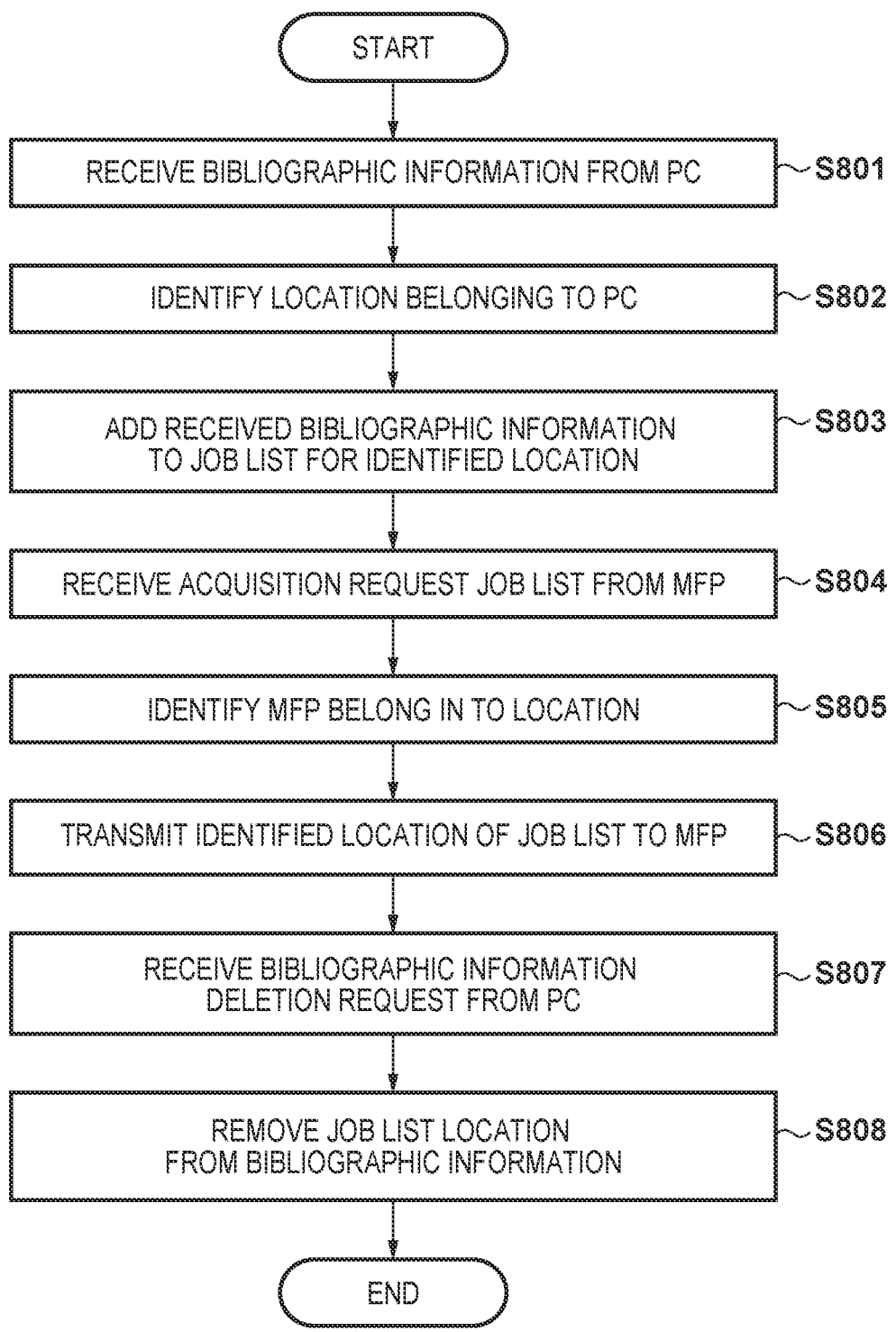
FIG. 12 is a flowchart of a printing process at a management server according to an embodiment of the present disclosure.

FIG. 12 is a flowchart illustrating a process when performing pull print in the management server 100 according to the present embodiment. The present process flow corresponds to the processes from S109 to S122 of FIGS. 5A-5B.

At S801, the management server 100 receives bibliographic information from the PC 103. The bibliographic information includes the network setting of the PC 103. The present process corresponds to the process at S109 of FIG. 5A.

At S802, the management server 100 identifies the location 120 to which the PC 103 belongs, using the held network setting.

At S803, the management server 100 adds a job corresponding to the received bibliographic information received at S801 to the job list for location 120 identified at S802. The present process corresponds to the process at S110.

At S804, the management server 100 receives a job list acquisition request from the MFP 101. The present process corresponds to the process at S112 of FIG. 5B.

At S805, the management server 100 identifies the location 120 to which the MFP 101 having transmitted the acquisition request at S804 belongs. The present process corresponds to the process at S113 of FIG. 5B.

At S806, the management server 100 transmits, to the MFP 101, the job list of the MFP 101 having identified the location 120 at S805, as a response to the acquisition request received at S804. The present process corresponds to the process at S114 of FIG. 5B.

At S807, the management server 100 receives a bibliographic information deletion request from the PC 103. The present process corresponds to the process at S121 of FIG. 5B.

At S808, the management server 100 identifies the bibliographic information specified in the deletion request received at S807 from the job list of the location 120 to which the PC 103 belongs, and deletes the bibliographic information from the job list. The present process corresponds to the process at S122 of FIG. 5B. Then, the present processing flow is terminated.

According to the present embodiment, as has been described above, moving the location of a PC causes the device setting of the printer driver registered in the PC to be automatically set to a setting suitable for the location. Therefore, it becomes possible to perform pull print suitable for the MFP, using the function of the MFP included in the location.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-134799, filed Jul. 22, 2019, which is hereby incorporated by reference herein in its entirety.

What is claimed is:

1. A management server configured to be connected, via a network, to a plurality of image forming devices and an information processing device having a printer driver, the management server comprising:
one or more memories; and
one or more processors that execute a set of instructions to:
manage, for each location, network information and information of print performance of an image forming device belonging to the location;
identify a location to which the information processing device belongs, based on the network information being managed, in accordance with receiving from the information processing device a notification about a changed network setting of the information processing device; and
transmit, to the information processing device, a device setting of the printer driver based on the information of print performance corresponding to an image forming device belonging to the location being identified,
wherein a device setting of the printer driver of the information processing device is updated based on the device setting transmitted from the management server.

2. The management server according to claim 1, wherein the processors further execute the set of the instructions to:
acquire a network setting and information of print performance from each of the plurality of image forming devices;
identify, based on the network setting being acquired and the network information being managed, a location to which each of the plurality of image forming devices belongs; and
update, for each location, the device setting of the printer driver based on information of print performance of an image forming device belonging to the location.

3. The management server according to claim 2, wherein, in a case where an ON-or-OFF settable item of the device setting of the printer driver has been set ON in the information of print performance being acquired for at least one image forming device, the item is set ON.

4. The management server according to claim 2, wherein a largest sheet size in the information of the print performance being acquired is set to an item of a maximum printable sheet size of the device setting of the printer driver.

5. The management server according to claim 2, wherein all colors indicated in the information of the print performance being acquired are set to an item of printable colors of the device setting of the printer driver as selectable setting values for the item.

6. The management server according to claim 2, wherein
management of information about an image forming device is terminated in response to receiving an instruction to release management of the image forming device, and
wherein the device setting of the printer driver is updated, for a location to which the image forming device originally belonged, based on information of print performance of another image forming device belonging the location after termination of the management.

7. The management server according to claim 1, wherein the processors further execute the set of the instructions to:
identify, in accordance with receiving information about a job from the information processing device, a location to which the information processing device belongs, based on the network information being managed, and register the job to a job list corresponding to the location being identified; and
identify, in accordance with receiving a job list acquisition request from an image forming device, a location to which the image forming device belongs, based on the network information being managed, and respond, to the image forming device, a job list corresponding to the identified location.

8. The management server according to claim 1, wherein a range of IP addresses and/or host names are managed for each location as the network information.

9. A control method for a management server configured to be connected, via a network, to a plurality of image forming devices and an information processing device having a printer driver, the control method comprising:
managing by managing section, for each location, network information and information of print performance of an image forming device belonging to the location;
identifying a location to which the information processing device belongs, based on the network information being managed by managing section, in accordance with receiving from the information processing device a notification about a changed network setting of the information processing device; and
transmitting, to the information processing device, a device setting of the printer driver based on information of print performance corresponding to an image forming device belonging to the location being identified,
wherein a device setting of the printer driver of the information processing device is updated based on the device setting transmitted from the management server.

10. A non-transitory computer readable storage medium on which is stored a computer program for making a computer execute a control method for a management server configured to be connected, via a network, to a plurality of image forming devices and an information processing device having a printer driver, the control method comprising:

managing by managing section, for each location, network information and information of print performance of an image forming device belonging to the location;

identifying a location to which the information processing device belongs, based on the network information being managed by managing section, in accordance with receiving from the information processing device a notification about a changed network setting of the information processing device; and transmitting, to the information processing device, a device setting of the printer driver based on information of print performance corresponding to an image forming device belonging to the location being identified, wherein a device setting of the printer driver of the information processing device is updated based on the device setting transmitted from the management server.

11. The management server according to claim 1, wherein the transmitted device setting indicates print performance of at least one image forming device among a plurality of image forming devices belonging to the identified location.

12. The management server according to claim 1, wherein a print job instructed by the printer driver of the information processing device based on the updated device setting is performed by the image forming device belonging to the location, and wherein a print job instructed by the printer driver of the information processing device based on the updated device setting is not performed by the image forming device not belonging to the location.

13. The management server according to claim 1, wherein a network setting of the information processing device is changed due to a change in the location of the information processing device.

14. An image forming system comprising:

an information processing device having a printer driver; and a management server, wherein the information processing device comprising:

one or more first memories; and one or more first processors that execute a set of first instructions stored in the first memories to:

transmit to the management server a notification about a changed network setting of the information processing device in accordance with detecting a change of the network setting of the information processing device;

update a device setting of the printer driver in accordance with receiving the device setting of the printer driver from the management server, wherein the management server comprising:

one or more second memories; and one or more second processors that execute a set of second instructions stored in the second memories to:

manage, for each location, network information and information of print performance of an image forming device belonging to the location;

identify a location to which the information processing device belongs, based on the network information being managed, in accordance with receiving from the information processing device a notification that a network setting of the information processing device has been changed; and transmit, to the information processing device, a device setting of the printer driver based on the information of a print performance corresponding to an image forming device belonging to the location being identified.

15. A management server configured to be connected, via a network, to a plurality of image forming devices and an information processing device having a printer driver, the management server comprising:

one or more memories; and one or more processors that execute a set of instructions to:

manage information of print performance of at least one first image forming device associated with a first location and information of print performance of at least one second image forming device associated with a second location; and in accordance with a detection of a location information of the information processing device from the first location to the second location, transmit, to the information processing device, a device setting of the printer driver based on the managed information of print performance corresponding to the at least one second image forming device associated with the second location.

\* \* \* \* \*